June 6, 1961 R. K. VAN VECHTEN 2,987,249

OPTICAL READ-OUT SYSTEM

Filed Feb. 19, 1958 2 Sheets-Sheet 1

Inventor
RICHARD K. VAN VECHTEN
By William E. Sleaver
Agent

June 6, 1961 R. K. VAN VECHTEN 2,987,249

OPTICAL READ-OUT SYSTEM

Filed Feb. 19, 1958 2 Sheets-Sheet 2

Inventor
RICHARD K. VAN VECHTEN

By William C. Gleaves

Agent

United States Patent Office 2,987,249

Patented June 6, 1961

2,987,249

OPTICAL READ-OUT SYSTEM

Richard K. Van Vechten, Clifton, N.J., assignor to International Telephone and Telegraph Corporation, Nutley, N.J., a corporation of Maryland Filed Feb. 19, 1958, Ser. No. 716,228
13 Claims. (Cl. 235—61.11)

This invention relates to data processing systems and in particular to a data information storage arrangement wherefrom the data is read by optical means.

In the data processing art there is normally required some form of data information storage and collaterally some means for reading out this stored information. There are many known devices for storing data information and reading the same, such as magnetic tapes, magnetic drums, storage tubes, tapes with punched holes, and film techniques. In some of these arrangements, for instance, the last two mentioned above, it is possible to use an optical readout whereby the information is represented on the storage medium by opaque and transparent portions arranged to transmit and block light in accordance with some information code.

When a storage medium is used which can be subjected to an optical readout, these arrangements are frequently limited in the speed of their read-out operation because of the probable loss of information bits during a stop and start operation of the storage medium. In other words, such a medium is very often a tape containing punched holes therein, and if this tape is caused to move past a source of light in order to have the light transmitted therethrough to a light sensitive detector on the other side of the tape, some of the information bits are very often lost as the tape is subjected to start and stop operations. This is true because at the stopping time of such a tape, the reading circuits are signaled to also be inoperative, and if the clutching arrangement and the gear trains that drive such tapes have an inherent amount of "backlash," the tape is driven by an overdrive, during the decelerating time, to an improper position. In the improper position the holes or information bits in the next position in the tape following the stop portion are located beyond the source of light in the direction of the drive. Therefore, when the tape is restarted, the system fails to read the first holes or information bits located in that position of the tape following the portion which was originally read.

It is therefore an object of this invention to provide an improved optical read-out system.

It is a further object of this invention to provide an improved optical read-out means which permits the data processing system to take a shorter look at the initially accelerated information bit and a longer look at the final deceleration information bit.

It is a still further object of the present invention to provide an improved optical read-out system which will enable the first information bit following the stopping operation to be read during the succeeding starting operation.

In accordance with a main feature of the present invention, there is provided a movable optical system which is moved to a first position when the storage medium is accelerated and restored to a second position when the storage medium is decelerated.

In accordance with another feature of the present invention, there is provided a light source disposed to pass light through the medium to the above-mentioned optical system and a light sensitive detecting means to detect the light passing through said optical system in either its first or its second position.

The above-mentioned and other features and objects of this invention will become more apparent by reference to the following description taken in conjunction with the accompanying drawings, in which.

Figures 1, 2, 3:
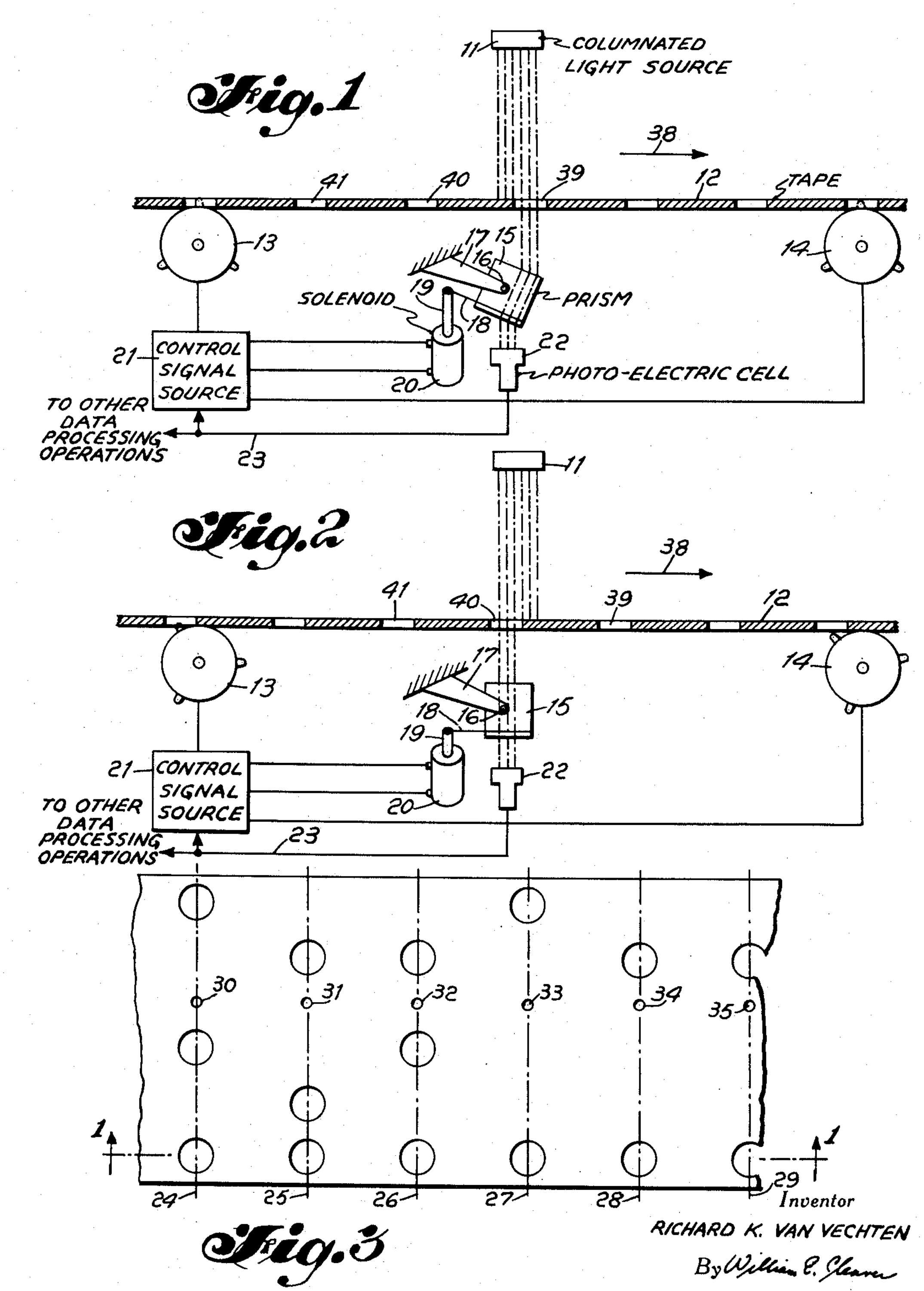
FIG. 1 is a schematic and block diagram of the invention with the prism shown in the position to which it is moved during the deceleration of the tape.
FIG. 2 is a schematic and block diagram of the invention showing the prism in the position to which it is moved during the acceleration of the tape and the position at which it remains while the tape is moving at terminal velocity.
FIG. 3 is a pictorial schematic of a portion of a tape having punched holes and including sprocket holes.

Referring specifically to FIG. 1, a preferred embodiment is shown wherein a source of columnated light 11 is shown disposed to transmit light to and through the tape 12. The source of light 11 is shown in columnated form for purposes of illustration, although this light source may be any light source which furnishes a light area developed on the storage medium, or tape, which is larger than the transparent or reflecting area of the medium. The driving means 13 and 14 are coupled to the tape 12 to drive the tape relative to the light source 11. A rectangular prism 15 is mounted on an axle 16 of a bracket 17. The rectangular prism 15 can be a pair of triangular prisms mounted back to back to pass light therethrough and therefrom at the same angle at which the light is received, or a plain parallel plate of glass such as that described on page 27 of the text "Fundamentals of Optics," by Jenkins and White, published in 1950 by McGraw-Hill. The prism 15 is placed in position to intercept and direct light from the source 11. A clamp lever 18 is fastened to the bottom of the prism 15 and is coupled to the movable core 19 of the solenoid 20. The solenoid 20 is coupled to the control signal source 21 which has another output coupled to the driving means 13 and 14. There is shown a photoelectric cell 22 located to receive the light from the source 11 which passes through the prism 15. Actually there are a number of such photoelectric cells with one each provided for each of the possible punched holes represented in FIG. 3. The control signal source 21 may be a conventional start and stop switching circuit normally used in the perforated tape transport field. It should be apparent that the start and stop signal from control source 21 to drivers 13—14 also controls the solenoid 20 in a parallel path operation for rocking the optical prism 15.

In FIG. 2 the components described above in connection with FIG. 1 are identical and are labeled with the same identification numbers as those described in FIG. 1. The photoelectric cells are coupled to the control signal source 21 and to other components in the data processing system by means of the channel represented by 23.

In FIG. 3 there are shown six information bit storage positions on the tape at 24, 25, 26, 27, 28 and 29. At each storage bit position there is found a sprocket hole as shown by 30, 31, 32, 33, 34 and 35.

Figure 4:
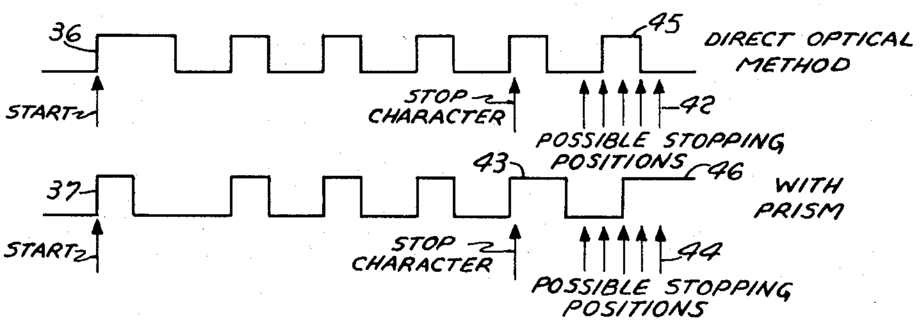
FIG. 4 shows two graphs related to one another on a time basis showing the output pulses that the system would sense using a direct optical method as compared with what the system senses using the inventive method with the movable prism.

In FIG. 4 there are shown two graphs. The waveform 36 shows the pulse output of the system if a direct optical method is used. The waveform 37 shows the pulse output from the system if a movable prism is used in accordance with the invention.

Figure 5:
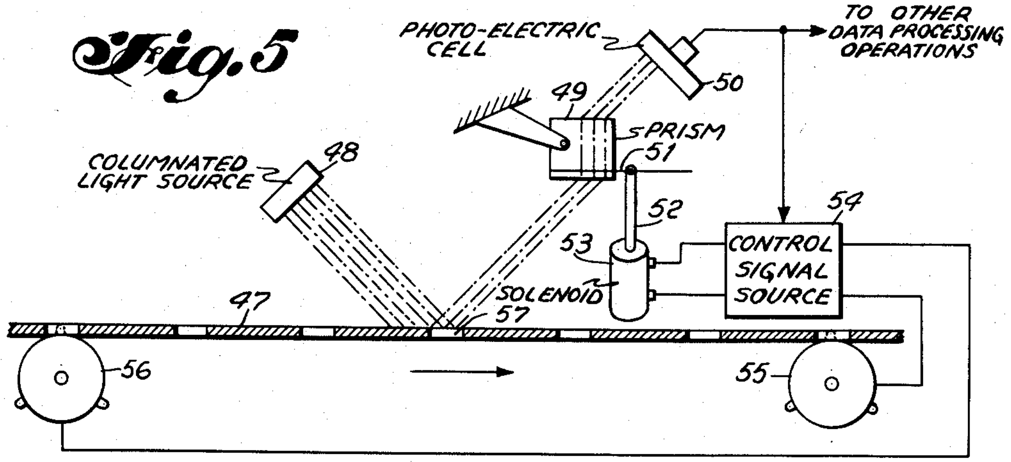
FIG. 5 shows a schematic block diagram of the invention with the information storage medium being composed of material that reflects and absorbs light and with the prism shown in the position to which it is moved during the deceleration of the medium.
Figure 6:
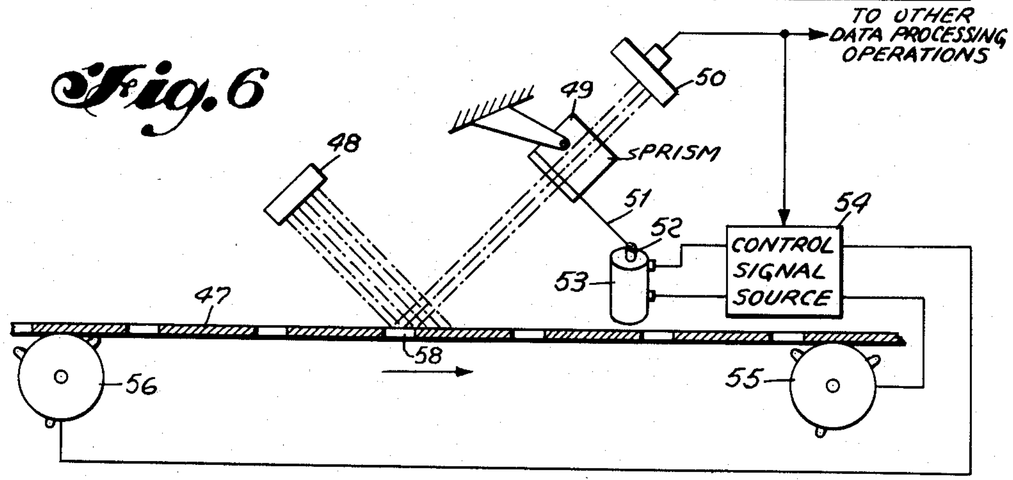
FIG. 6 is a schematic and block diagram identical to FIG. 5 excepting the prism is shown in the position to which it is moved during the acceleration of the medium.

In FIGS. 5 and 6 there is shown a medium 47 which reflects and absorbs light. The source of light 48 is disposed to transmit light to the medium 47. A rectangular prism 49 is located to intercept and direct the light reflected from the medium 47 and pass the light to a photoelectric cell 50. A clamp lever 51 is fastened to the bottom of the prism 49 and is coupled to the movable core 52 of the solenoid 53. The solenoid 53 is coupled to the control signal source 54 which has another output coupled to the driving means 55 and 56. There is shown one photoelectric cell 50 located to move the light from the source which passes through the prism 49. Actually there are a number of such photoelectric cells with one each provided for each possible laterally located reflection portion.

Considering FIG. 1 in connection with the operation of the system, the tape 12 is shown to be driven according to the arrow 38. If the tape has not been started, the prism 15 will be in the tilted position as shown in FIG. 1. The hole 39 represents the first hole of the immediate operation to be read. A start signal from the control signal source 21 to the driving means 13 and 14 will start the tape 12 accelerating in the direction indicated by 38. The tape will reach its terminal velocity between the punched hole positions 39 and 40. Simultaneously with the start signal to the driving means there will also be a signal transmitted to the solenoid 20. The energization of the solenoid 20 causes the movable core 19 to move within the solenoid thus pulling the clamp lever 18 to its lowest position. When the clamp lever 18 is pulled to its lowest position, the prism 15 swings on the axle 16 of the bracket 17 to be positioned vertically as shown in FIG. 2 rather than remaining at an angle as shown in FIG. 1. By moving the prism 15 in a counterclockwise direction as the tape passes to the right during the acceleration, the initial pulse is shortened from what it would have been had the prism not been rotated. The system now sees an initial pulse with a width which is similar to the width of the pulses sensed as the system reads the holes 40 and 41, etc., while the tape moves at terminal velocity. This relationship is depicted in FIG. 4. The waveform 36 in FIG. 4 shows what the initial pulse might look like with a direct optical method or in the case of the invention if the prism 15 remained at the tilted angle during the acceleration of the tape. The waveform 37 shows a shortened initial pulse which the system senses when the prism 15 is rotated to its vertical position. The system senses the shortened pulse depicted by the waveform 37 because the light from the source 11 which passes close to the leading edge of the hole 39 and is originally intercepted by the prism 15 no longer is passed to the photoelectric cell 22 when the prism 15 is in its vertical position. This in effect cuts down the amount of light and therefore the time that the photoelectric cell sees light through he hole 39, but this shortened time is compensated since the tape 12 is accelerating and, therefore, the hole 39 takes a longer period of time to pass by the lesser amount of light described above. The sprocket holes 30 through 35 are present whether or not there are any code holes present, and therefore, a gating circuit to provide synchronism is operated in response to a light pulse through the sprocket holes. The gating circuit can be any well-known gating circuit and is not shown in the figures.

When the tape has reached terminal velocity and the prism 15 is in its vertical position as shown in FIG. 2, the photoelectric cell 22 will be exposed to the light coming from the source 11 for a uniform period of time as each of the holes 40 and 41, etc., passes between the light source and the prism 15. When there is a code on the tape such as any one of the codes shown in FIG. 3 at the positions 24 through 29 indicating that the tape should stop, a signal is passed from the photoelectric cells, such as 22, along the respective channels, such as 23, to the control source 21. The control signal source sensing the code signal to stop, transmits a stop signal to the driving means 13 and 14 and simultaneously de-energizes the solenoid 20. Referring again to FIG. 4, there are depicted two possible pulse outputs after the tape has received the stop signal. When the stop signal has been sensed in a system using the direct optical method, the stop character output pulse is normal and the machine stops the tape after having received the stop pulse. There are shown at 42 several possible stopping positions of the tape. The waveform 37 also shows a stop character output pulse at 43 which is an elongated pulse, and this comes into being since at the time that the tape receives the signal to stop, the prism 15 is rotated to its vertical position, thus allowing the light which had been missing the prism to be intercepted and therefore give this elongated pulse output. By tilting the prism 15, the optical means moves with the tape and allows the system to be looking in the direction of the movement of the tape, either ahead of or in the next hole to be read. The same possible stopping positions are shown in connection with the waveform 37 at 44. It becomes clear from examing the possible stopping positions 42 and 44 that if the tape were to be stopped at the furthermost positions in the direction of travel of the tape, or in the graph the most right-hand positions, that the first pulse 45 of the next reading operation would be missed. On the other hand, if the tape were to be stopped in these same furthermost right-hand positions as shown at 44, it becomes clear that the first pulse 46 of the next operation will be read.

By permitting the prism to be tilted during the deceleration the system is assured that the first pulse following a stop pulse will be read even though the inherent backlash of the drive system permits the tape to be driven to an improper position.

This invention has been described for illustration in connection with a punched tape, providing for the light to pass through the holes. The invention could be used with a medium having transparent and opaque areas such as a film. With such a film, the equipment arrangement would be identical to that shown in connection with the punched tape. The invention, however, could be readily used with a system where the medium was such as to depend on having light reflecting areas and non-reflecting areas, with such areas arranged to represent an information code.

Referring to FIGS. 5 and 6 the light from the source 48 is transmitted to the reflecting and absorbing medium 47. The reflecting and absorbing portions of 47 are arranged to represent coded information. In FIG. 5 the prism 49 is shown in the position at which it is held prior to the starting of the travel of the medium 47 and to which it is rotated during the deceleration of the medium. Assuming that the reflecting portion 57 is the first portion to be read at the next operation, the light is reflected therefrom through the prism 49 to the photoelectric cell 50. When the medium 47 has been accelerated the prism 49 is rotated clockwise to a position as shown in FIG. 6. It becomes clear that the next reflecting portion 58 is read at a position in back of where it would have been read had the prism not been rotated. The operation of the invention in connection with the reflecting medium is similar to that described in connection with the punch tape and need not be herein described again.

While I have described above the principles of my invention in connection with specific apparatus, it is to be clearly understood that this description is made only by way of example and not as a limitation to the scope of my invention as set forth in the objects thereof and in the accompanying claims.

I claim:

1. An optical read-out system to be used for reading information bits from an information storage medium having light attenuating and non-attenuating portions representing information, comprising a source of light, an information storage medium having light attenuating and non-attenuating portions representing said information, first means to move said medium relative to said source of light, a movable optical system disposed to intercept and direct light from said source which is not attenuated, second means coupled to said optical system to move said optical system to a first position when said medium is accelerated and to restore said optical system to a second position when said medium is decelerated, means coactive with the movement of said medium to control said second means when said medium is being accelerated and decelerated, and a light sensitive detecting means disposed to detect said intercepted light from said optical system.

2. The optical readout system of claim 1 wherein said movable optical system is activated by start and stop signals to change the pulse width of the terminal information bits.

3. An optical read-out system to be used for reading information bits from an information storage medium having opaque and transparent portions representing information, comprising a source of light, information storage medium having opaque and transparent portions representing said information, moving means to move said medium relative to said source of light, a movable optical system disposed to intercept and direct light which passes through said transparent portions from said source, actuating means coupled to said optical system to move said optical system to a first position when said medium is accelerated and to restore said optical system to a second position when said medium is decelerated, means coactive with the movement of said medium to control said actuating means when said medium is being accelerated and decelerated, and a light sensitive detection means disposed to detect said intercepted light from said optical system.

4. An optical read-out system according to claim 3 wherein said optical system includes a rectangular prism.

5. The optical readout system of claim 3 wherein said movable optical system is activated by motion control signals for the information storage medium to provide equalizing compensating changes in the pulse widths of the terminal information bits.

6. The optical readout system of claim 3 wherein said optical system actuating means is responsive only to the starting and stopping of said information storage medium.

7. The optical readout system of claim 6 and a source of start and stop control signals coupled to the moving means of said information storage medium and to said actuating means.

8. An optical read-out system to be used for reading information from an information storage medium having opaque and transparent portions representing said information, comprising a source of columnated light, a tape having punched holes therein representing said information, a sprocket driving means coupled to said tape for movement thereof relative to said source of light, a movable rectangular prism disposed to intercept and direct light which passes through said punched holes from said source, actuating means coupled to said prism to move said prism to a first position when said tape is accelerated and to restore said prism to a second position when said tape is decelerated, control means responsive to the movement of said tape to control said actuating means when said tape is being accelerated and decelerated, and a light sensitive detection means disposed to detect said intercepted light passing through said prism.

9. An optical read-out system according to claim 8, wherein said actuating means includes a solenoid with a movable core and a lever clamp coupled between said prism and the movable core of said solenoid.

10. An optical read-out system according to claim 8, wherein said control means includes a source of control signals coupled to said sprocket driving means and said actuating means.

11. An optical read-out system according to claim 8, wherein said light sensitive detection means includes a photoelectric cell.

12. An optical read-out system to be used for reading information from a punched hole information storage medium, comprising a source of columnated light whose cross-sectional area is larger than the area of a punched hole, a punched hole information storage medium, moving means to move said medium relative to said source of light, a movable prism disposed to intercept and direct light which passes through said punched holes, a lever clamp coupled to the base of said prism, a solenoid having a moving core, said movable core coupled to said lever clamp to produce a movement of said prism to first and second positions respectively when said solenoid is energized and de-energized, a control signal source coupled to said moving means and said solenoid to energize said solenoid when said tape is accelerated and de-energize said solenoid when said tape is decelerated, and a plurality of photoelectric cells disposed to detect said intercepted light from said prism.

13. An optical read-out system according to claim 12, wherein there is further included circuitry means coupling the output of said photoelectric cells to said control signal means.

References Cited in the file of this patent

UNITED STATES PATENTS 2,801,343 Johnson ---------------- July 20, 1957